United States Patent [19]

Chauquet

[11] Patent Number: 4,530,158

[45] Date of Patent: Jul. 23, 1985

[54] GAUGE FOR TESTING THE DEPTH OF A HOLE

[75] Inventor: Jacques Chauquet, Bonneville, France

[73] Assignee: Etablissments J. M. Chauquet, Cluses, France

[21] Appl. No.: 502,094

[22] Filed: Jun. 8, 1983

[30] Foreign Application Priority Data

Jun. 14, 1982 [FR] France ................ 82 10832

[51] Int. Cl.$^3$ ............................................. G01B 5/18
[52] U.S. Cl. .................. 33/169 B; 33/199 R
[58] Field of Search ........... 33/169 B, 199 R, 199 B, 33/169 R, 172 R

[56] References Cited

U.S. PATENT DOCUMENTS

| 2,401,085 | 5/1946 | Valley | 33/169 B |
|---|---|---|---|
| 2,517,846 | 8/1950 | Craig . | |
| 2,529,988 | 11/1950 | Zempel | 33/169 B X |
| 3,015,892 | 1/1962 | Stuart | 33/169 B |
| 3,936,945 | 2/1976 | Jevremov | 33/169 B |
| 4,028,812 | 6/1977 | Fieberg | 33/169 B |
| 4,314,406 | 2/1982 | Barnes . | |

FOREIGN PATENT DOCUMENTS 563638 9/1958 Canada ................ 33/169 B
1698339 4/1961 Fed. Rep. of Germany .

OTHER PUBLICATIONS

Technical Digest—Western Electric, No. 24, Oct. 1971, New York (US).
IBM Technical Disclosure Bulletin, vol. 13, No. 5, Oct. 1970, Armonk, (US).

Primary Examiner—William D. Martin, Jr.
Attorney, Agent, or Firm—Roland Plottel

[57] ABSTRACT

The device comprises a body having a longitudinal central bore for passing a probe therethrough intended to penetrate into the hole to be tested. The probe is fixed to the body by a matching socket having a locking screw. A ring is slidably mounted on the body, and secured against rotation by a screw engaged in a longitudinal groove of the body. A spring pushes the ring back with respect to the body, the movement being limited by a stop. The front part of the ring receives an insert stop coming to bear against the outer face of the workpiece to be tested. At the end of penetration of the probe into the hole, the rear part of the ring comes opposite an annular mark formed in the body.

16 Claims, 6 Drawing Figures

GAUGE FOR TESTING THE DEPTH OF A HOLE

BACKGROUND OF THE INVENTION

The present invention relates to gauges used in industry for measuring or checking the depth of a hole which may be an internally threaded or tapped hole.

Testing threaded holes is usually carried out in two successive operations: a first operation for checking the diameter and the quality is effected by screwing into the tapped hole one or more standard gauges comprising a threaded head, a central narrowed portion and a handling sleeve. A second operation for checking the depth is achieved by screwing into the hole a length gauge, comprising for example a threaded head, a handling sleeve and a shoulder intended to come into abutment against the edges of the hole at the end of screwing. The high cost of standard gauges leads to using the same standard gauge for checking all the tapppings having the same characteristics but of any depth, and in using a different length gauge for each tapping depth. However, the wear of a length gauge, following numerous tests, cannot be compensated for and ends in this gauge being discarded, which is moreover relatively expensive because of its unitary construction.

Gauges comprising certain improvements have been proposed; thus the review Technical Digest—Western Electric describes a gauge comprising a body having a probe intended to penetrate into the hole, a mobile part sliding freely over the body and whose front end comes into abutment against the outer part of the workpiece to be checked; stops limit the sliding of the mobile part and prevent rotation thereof with respect to the body. This device has the disadvantage of being specialized for a single hole size, and for each diameter and/or depth an adequate gauge is required. The length of the probe and its position with respect to the body are not adjustable, the probe not being interchangeable either. The mobile part forms the handling member and is necessarily rotated, which prevents this type of gauge from being used in some applications.

The review IBM TECHNICAL DISCLOSURE BULLETIN describes a similar gauge in which a probe is inserted by screwing along a central axis of a body forming a handling member. No means is provided for allowing axial adjustment of the probe on the body. A mobile part slides and rotates freely on the body and comes into abutment against the workpiece to be checked. The user must deliberately hold the mobile part against the workpiece to be tested. Furthermore, the device does not allow commercially available standard gauges to be used, since the probes must be formed specially for fitting them to the body.

U.S. Pat. No. 4,314,406 describes a device allowing measurement by transfer to a subsidiary apparatus, which considerably complicates the operations.

Patents DE No. 1 698 339 and U.S. Pat. No. 2,517,846 describe micrometric depth gauges whose function is to measure the depth of a hole and cannot measure a tapping depth. In fact, a mobile part, carrying the workpiece to be tested, moves with respect to the body exclusively by screwing; the pitch of this screwing is practically always incompatible with the pitch of the tapping to be checked.

The present invention has more especially as object to obviate the disadvantages of known devices by making available to the user a general purpose gauge, allowing ready adjustment of the effective gauge length to adapt it to the nominal length of the hole or tapping to be checked, either because this adjustment is made necessary through the wear resulting from intensive use, or because said length is modified because, for example, of a change in tolerance during manufacture or because it is desired to test holes having different nominal lengths.

According to one object of the invention, the device allows insertable commercially available probes to be used, and for example standard plug gauges used for checking the diameter and the quality of tappings formed. Thus, the device allows, by a single operation on the part of the user, the quality and the diameter of the tapping to be checked and its length measured simultaneously whereas known devices require two successive separate operations, a first one for the diameter and a second one for the length.

According to another object of the invention, the device allows threaded plugs or probes to be fitted to the gauge whose sleeves have very different diameters and shapes, allowing more especially holes or tappings of very different dimensions to be checked.

According to another object of the invention, the device allows holes to be checked formed in parts of different shapes, by being more especially adjustable to reference surfaces of different shapes. With the device of the present invention, holes may for example be checked disposed at the bottom of a groove by taking as reference surface the bottom of the groove. It may also be adapted to surfaces of different shapes such as cones. spherical surfaces or others.

According to another object of the invention, the gauge may serve for tests other than those of the effective tapped depth, such as testing blind bores, and recessed bearing surfaces.

According to another object of the invention, a tool is provided of low cost price, permitting however a remarkably reliable and accurate multi-purpose test.

SUMMARY OF THE INVENTION

For this, and according to one feature of the invention, the gauge comprises a body having a probe for penetrating into the hole, and adjustment means for adjusting the axial position of the probe with respect to the body, for example a longitudinal through-bore in which the probe slides; means interlock selectively the body and the probe; a mobile part sliding longitudinally along the body comprises a front end intended to come into abutment against the outer part of the workpiece to be checked; resilient means push the mobile part forwards in the direction of the part to be checked, a stop limits the forward movement of the mobile part with respect to the body; indexing means allow the position of the mobile part to be determined with respect to the body once the probe is introduced into the hole.

In a first variant of the invention, the mobile part is a rod sliding in an off-centered bore of the body.

According to another variant, the mobile part is a ring sliding over the outer cylindrical surface of the body. Thus a manual tool is provided which is easy to handle.

According to another feature of the invention, the means for interlocking the body and the probe together comprise an interchangeable matching socket secured to the body having a longitudinal bore for introducing the probe therein with a small clearance and a radial locking screw. Probes of different diameters may be fitted to the gauge by changing the socket.

In another variant, it may be preferred to interlock the body and the probe together by means of a substantially cylindrical resilient clamp having a longitudinal bore for passing the probe therethrough and whose wall is split; the ends of the outer surface of the wall are shaped like cones, the clamp being inserted into the longitudinal bore of the body so as to bear against a corresponding conical shoulder of the bore; the clamp is pushed by an axial clamping pusher, the pusher having a longitudinal bore for passing the probe therethrough, and being adjustable and lockable in a longitudinal position with respect to the body. Adaptation to probes of different diameters is thus automatic for several closely related diameters, by clamping and deformation of the clamp.

According to another feature of the invention, the axial pusher is a screw fitted into the tapped end of the longitudinal bore of the body. With this arrangement, a gauge may be provided in which the pusher is not readily accessible, since it requires a tool for removal thereof. Such a gauge is particularly suitable for tests carried out during the manufacture of parts, for the possibilities of disturbing the length adjustment are thus avoided since the probe cannot be separated from the body and moved without using a tool.

According to another feature of the invention, the axial pusher is a tapped ring, fitted by screwing over the rear threaded end of the body. With such an arrangement, a gauge is provided in which the probe is readily interchangeable and adjustable in length. Such a gauge is particularly suitable for tests carried out in test laboratories.

In the preceding embodiments, those may be preferred in which the components forming the gauge are pieces of revolution, so as to facilitate grasping of the device. However, during screwing up and unscrewing, the user is led to exert a rotational torque on the body of the device and possibly on the threaded clamp tightening ring. This torque should not cause rotation of the ring with respect to the body, which would lead to releasing the probe and possibly modifying the length adjustment of the gauge. For that, a ring may be loosely fitted to the tapped ring, locked longitudinally on the tapped ring and associated with a removable locking means for selectively interlocking the two rings. Removal of the locking means frees the loose ring, so that the user does not have access to the tapped ring and cannot release the clamp. Thus again a tool is provided suitable for tests during manufacture. This arrangement further limits the maximum operating torque transmitted to the probe by disposing resilient means providing friction between the threaded ring and the loose ring. According to another feature of the invention, there is provided at the end of the mobile part an added stop having a longitudinal bore for passing the probe therethrough and shaped so as to match the shape of the reference surface of the part to be checked. Thus, with the same gauge and by changing the added stop, holes may be tested in parts having different external surfaces. In the case of surfaces which are not of revolution, the added stop may be advantageously mounted for rotation, by holding it in position along longitudinally on the mobile part. Rotation of the mobile part is thus not hindered by friction of the stop against the workpiece to be tested.

Other features and advantages of the present invention will be clear from the following description of particular embodiments, made with reference to the accompanying figures.

DESCRIPTION OF THE PREFERRED EMBODIMENTS

Figure 1:
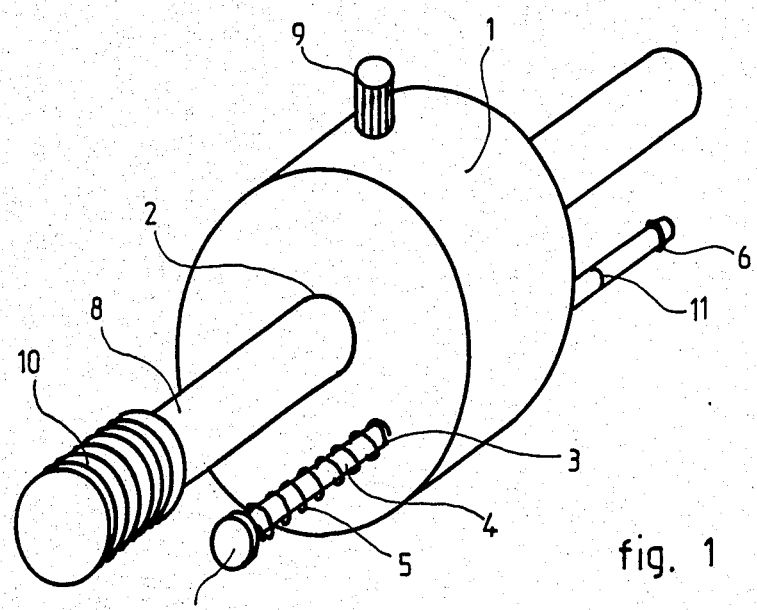
FIG. 1 is a perspective view of a simplified embodiment of the present invention.

In the simplified embodiment of FIG. 1, the gauge of the invention comprises a body 1 having a longitudinal bore 2 and a secondary off-centered bore 3. A mobile rod 5 slides in the off-centered bore 3, urged forwardly by a spring 5, its movement being limited by a stop 6 coming into abutment against the body 1 at the end of travel. The front end 7 of rod 4 is intended to come against the outer surface of the workpiece to be tested and slides in bore 3 during the testing operation. A probe 8 in the form of a rod, such as a threaded plug, is introduced into the longitudinal bore 2 and is locked in position by a radial locking screw 9.

The device may be used for checking the effective length of tappings formed in a bore of a part. For that, probe 8 comprises a threaded front end 10, intended to be screwed into the tapping to be tested. During screwing, the body, integral with probe 8, approaches the workpiece to be tested, the front end 7 of mobile rod 4 coming to bear against the outer surface of the part. The gauge is previously set by adjusting the position of probe 8 in body 1 and by tightening the locking screw 9 so that once the probe 8 has been introduced into the tapping to be tested, a mark 11 on rod 4 comes opposite a given part of the body 1.

Figure 2:
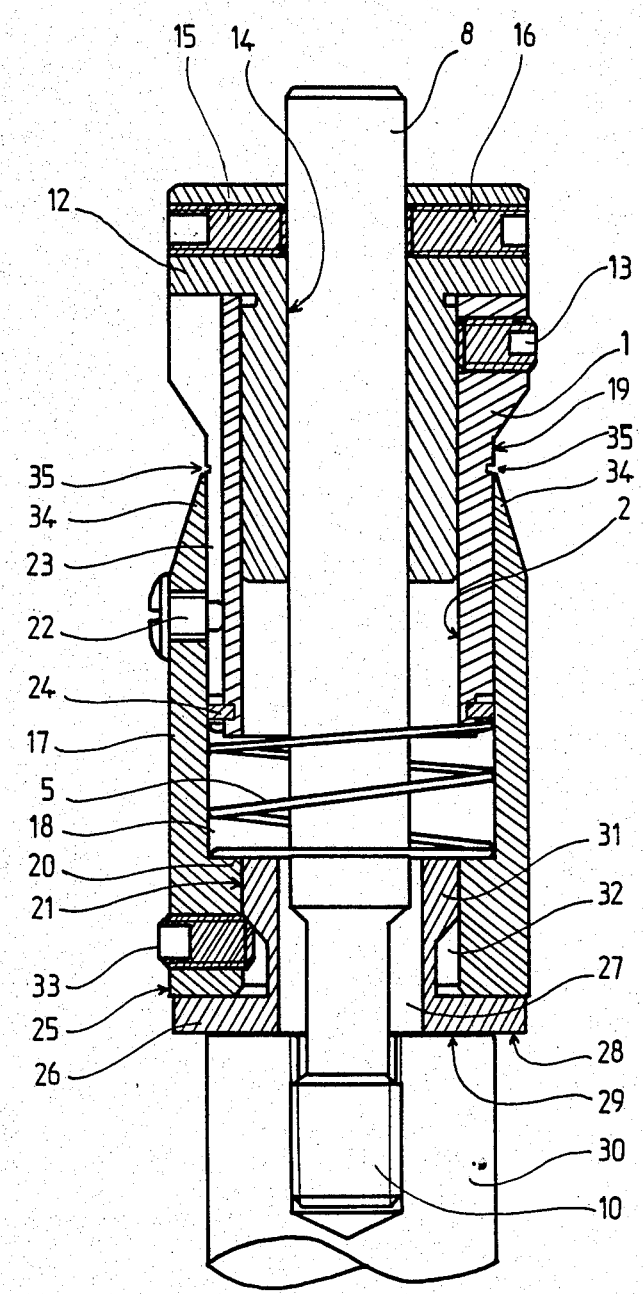
FIG. 2 is a longitudinal sectional view of a gauge of the present invention according to a second embodiment.

In the embodiment shown in FIG. 2, body 1 has a general substantially cylindrical shape and comprises a single central longitudinal bore 2, of a diameter appreciably greater than the diameter of probe 8. Fitting of probe 8 into body 1 is effected by means of a fitting socket 12, shaped so as to fit into the bore 2 of body 1 in which it is locked by a locking screw 13, and having a longitudinal central bore 14 into which probe 8 fits with a small clearance. The probe is locked in the matching socket 12 by radial locking screws 15 and 16.

On body 1 slides a mobile part corresponding to the mobile rod 4 of the first embodiment. In this second emodiment, the mobile part is a ring 17, having a longitudinal cylindrical bore 18 mating with the outer surface 19, which is also cylindrical, of body 1. Bore 18 is limited by a front shoulder 20 and is continued forwardly by a bore 21 of smaller diameter. Ring 17 may be secured against rotation by a stud 22, such as a screw, integral with ring 17 and sliding in a longitudinal groove 23 formed in the outer surface 19 of body 1. The travel of ring 17 is limited forwardly by a stop 24 against which stud 22 comes to bear at the end of travel. A compression spring 5 bears against stop 24 integral with body 1 and against a shoulder 20 integral with ring 17 and tends to separate the ring and the body from each other.

On the front part 25 of ring 17 is secured a removable ring 26, comprising a longitudinal bore 27 of a diameter greater than probe 8 to allow passage thereof therethrough, and whose front face 28 is shaped so as to mate with the corresponding reference face 29 of the workpiece to be tested 30.

In the embodiment shown in FIG. 2, the added stop 26 is mounted freely rotatable on ring 17 and comprises a cylindrical rear part 31 engaging in bore 21 of the ring and having a peripheral groove 32 in which is engaged a radial screw 33 of ring 17.

The rear end 34 of ring 17 is thinned down and ends in a chamfered portion, as shown in the figure, the end of the chamfer being intended to coincide, during the test operation, with an annular mark 35 formed in the outer cylindrical surface 19 of body 1. Several successive annular marks 35 may of course be provided.

With the second embodiment shown in FIG. 2, a more compact gauge is obtained than in the first embodiment, and more convenient to hold in the hand. However, fitting thereof to probes of different diameters requires the matching socket 12 to be changed. A third embodiment, shown in FIG. 3, facilitates fitting to probes of different diameters and leads to even more compact constructions presenting more complete functions. In this third embodiment, body 1 is also generally cylindrical in shape and comprises a longitudinal bore 2 of a diameter greater than the diameter of the probes to be inserted. The longitudinal bore 2 is extended rearwardly by a second bore 36 of larger diameter to which it is connected by a conical shoulder 37. A resilient clamp 38, whose outer surface is cylindrical and shaped so as to be insertable in the second bore 36 of the body, has a longitudinal bore for passing probe 8 therethrough. The wall of the clamp is split, as shown in the figure, to provide flexion and resilience thereof. The ends of the outer surface of the clamp are tapered, the front end 39 coming to bear against the tapered shoulder 37 of body 1 so as to cause the clamp to tighten under the action of forward axial thrust of the clamp. Clamp 38 is thrust and held in position by an axial tightening pusher 40. Pusher 40 is itself provided with an axial longitudinal bore 41 for passing a probe 8 therethrough, the front part of bore 41 being of a sufficient diameter and tapped so as to fit screwingly on to the threaded rear part of body 1. In the embodiment shown in the figure, pusher 40 itself comprises an inner tapering shoulder 42 against which comes to bear the second equally tapering end 43 of clamp 38.

Body 1 comprises an outer cylindrical surface 19 having one or more annular marks 35 as in the preceding embodiment. The front part of body 1 is also substantially cylindrical and of a smaller diameter, connected to the rear part 19 by a shoulder 44. A ring 17 slides over the outer surface 19 of body 1 as in the preceding embodiment and comprises a longitudinal bore 18 mating with the outer surface 19 of body 1 and a second front bore 21 of smaller diameter mating with the front part of body 1. A screw 22, integral with the ring 17, slides in a longitudinal aperture formed in body 1 for securing ring 17 against rotation with respect to the body. A helical compression spring 5 bears on the one hand on shoulder 20 of ring 17 and on shoulder 44 of body 1 so as to separate them from each other. Screw 22 also serves as a stop, coming to bear at the ends of the corresponding aperture 45 of body 1 so as to limit the movement of ring 17 forwardly and rearwardly.

Figure 3:
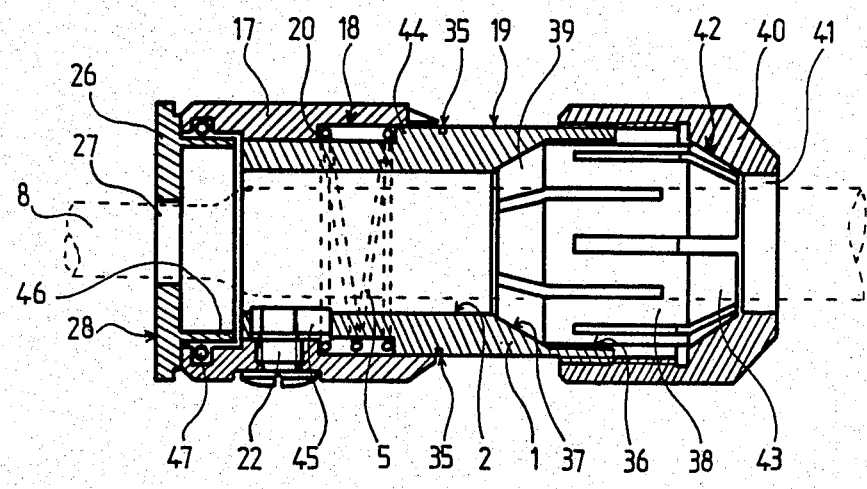
FIG. 3 is a longitudinal sectional view of a gauge of the present invention according to a third embodiment.

In the embodiment shown in FIG. 3, the inserted stop 26, comprising a longitudinal bore 27 for passing the probe therethrough and a front face 28 for fitting against the workpiece to be tested, is simply force fitted into the front end of the central bore of the ring 17. For that it comprises a slightly tapered rear portion 46 in the form of an inverted cone, widening out rearwardly, and locked in psoition by an O seal 47 inserted in a circular groove of the bore of ring 17.

Figure 4:
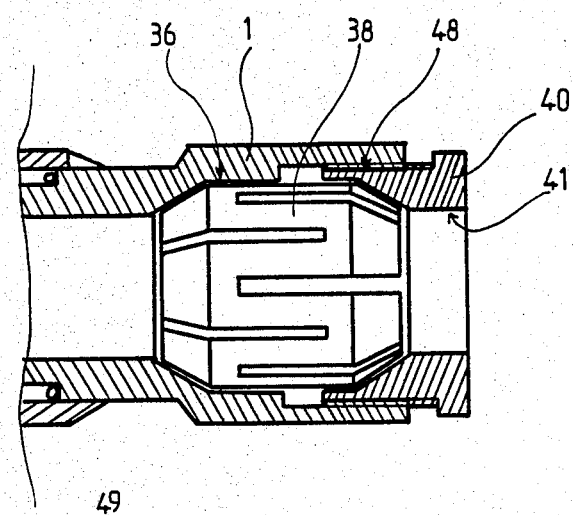
FIG. 4 is a partial longitudinal sectional view of a variant of the gauge of the embodiment shown in FIG. 3.

In FIG. 4 there has been shown one embodiment in which the clamping of clamp 38 is provided by a pusher 40 of a different shape: so as to avoid incorrect operation of pusher 40, this latter is shaped like a screw, as shown in the figure, having a central bore 41 and a threaded cylindrical part 48 screwable into the rear tapped end of bore 36 of body 1.

Figure 5:
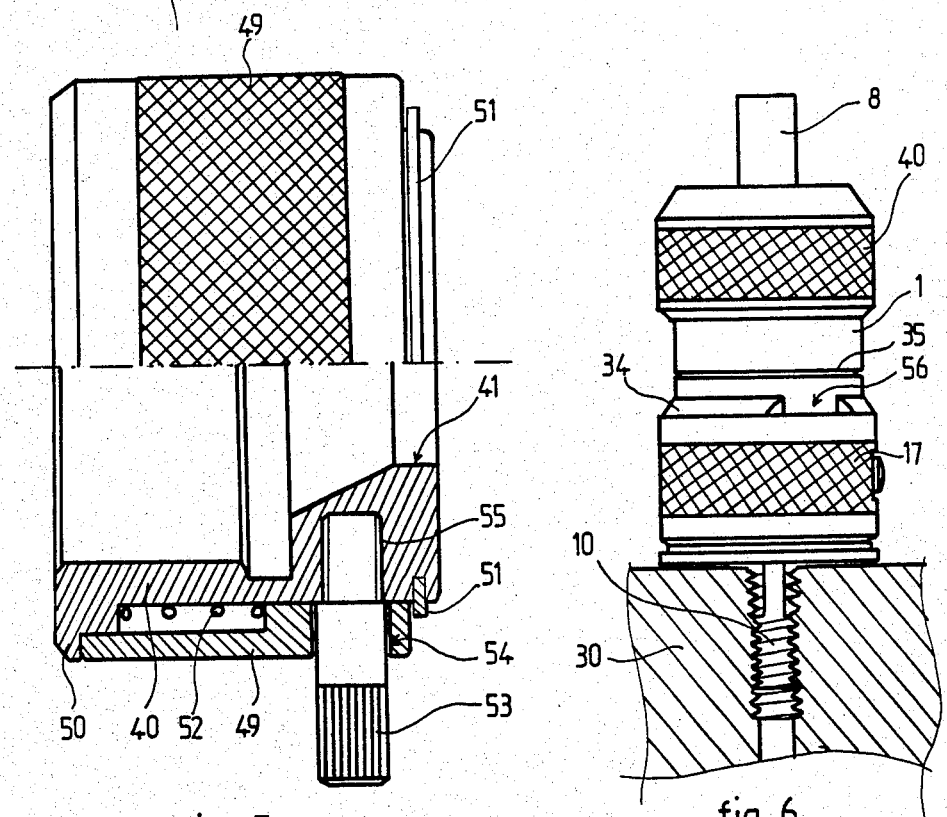
FIG. 5 is a longitudinal half-sectional view of the clamp pusher according to another embodiment.

In FIG. 5 has been shown one embodiment of the pusher for tightening clamp 38 in which pusher 40, in the shape of a ring as in the embodiment of FIG. 3, fitted by screwing against the outer face of body 1, is covered by a loose ring 49. As shown in FIG. 5, the loose ring 49 freely rotates about the cylindrical pusher 40, and has its longitudinal movements limited by a front shoulder 50 and a rear key 51 of the pusher. A helical spring 52, inserted into a housing as shown in the figure between the loose ring and the pusher, produces a controlled friction between the ring and the pusher for limiting the torque transmitted to the pusher by rotation of the ring to a predetermined value. A removable locking screw 53, by passing through an aperture 54 of the loose ring 49 and screwing into a corresponding housing 55 of pusher 40, locks the ring on the pusher and thus transmits to the pusher the rotational forces imparted to ring 49.

Figure 6:
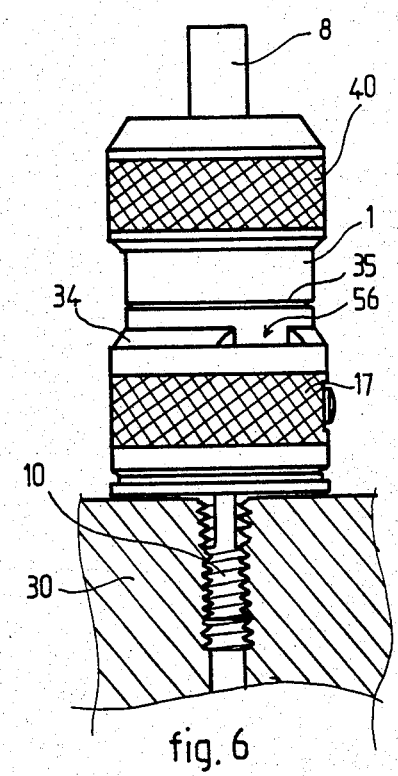
FIG. 6 is for illustrating the operation of the gauge of the invention.

In FIG. 6 has been shown a side view of the gauge according to the embodiment of FIG. 3. The outer faces of ring 17 and pusher 40 are partially knurled so as to facilitate grasping thereof. The rear chamfered end 34 of ring 17 comprises notches 56 for making the annular masks 35 partially visible should the end of the tapered part 34 go beyond these marks.

The operation of the devices is as follows: a probe 8 is inserted into the longitudinal bore of the gauge, the probe being locked at a predetermined length by locking means 40. The front end 10 of the probe 8 is gradually inserted into the workpiece 30 to be tested. During this penetration, ring 17 comes into abutment against the outer face of workpiece 30 and is thus retained whereas body 1 advances to follow probe 8. At the end of penetration, if the hole to be tested has a correct length, mark 35 must be opposite the end of the tapered part 34 of ring 17.

If a special probe 8 such as a plug usually used for checking the diameter and the quality of tappings is fitted into body 1, the quality and the diameter of the tappings as well as their length may be tested in a single operation. In this case, the plug is caused to penetrate by being screwed into the bore to be tested, the threaded front part 10 at the end of travel coming into abutment at the end of the tapping.

The present invention is not limited to the embodiments which have been explicitly described, but it includes the different variations and generalizations thereof contained within the scope of the following claims. The different embodiments of the devices for locking probes 8 in body 1 may in particular be combined with the different embodiments of the inserted stops 26.

What is claimed is:

1. A gauge for determining the depth of a hole, comprising a main body, a probe carried by said main body intended to penetrate said hole, a mobile member slideably carried by said main body for longitudinal movement with respect to said main body, said mobile member having one end thereof adapted for abutment against an outer surface of a workpiece having a hole whose depth is to be determined, a stop member carried by said mobile member for limiting the forward movement thereof, indexing means carried by said main body member for indicating the relative position of said mobile member with respect to said main body and thereby determining the depth of said hole when said probe member is at the end of the forward movement into said hole, adjustment means for adjusting the axial position of said probe with respect to said main body, locking means interacting between said probe and said main body for selectively angularly and axially fixing the position of said probe in said main body in a chosen position, and resilient means acting on said mobile member for urging said mobile member in a direction toward said workpiece having said hole to be tested.

2. The gauge as claimed in claim 1, wherein said main body has a longitudinal through-bore in which slides an insert and interchangeable probe.

3. The gauge as claimed in claim 2, wherein said mobile member is a rod, said rod arranged for sliding movement in an off-centered bore of said main body.

4. The gauge as claimed in claim 2, wherein said mobile member comprises a ring slideably carried over the cylindrical outer surface of said main body.

5. The gauge as claimed in claim 4, wherein said locking means comprises, inserted in the body and interchangeable, a matching socket having a longitudinal bore for introducing the probe with a small clearance therein and a radial locking screw.

6. The gauge as claimed in claim 4, wherein said locking means comprises a substantially cylindrical resilient clamp having a longitudinal bore for passing the probe therethrough and whose wall is split, the ends of the outer surface of the clamp being tapered, the clamp being inserted in the longitudinal bore of said main body so as to come to bear against a corresponding tapered shoulder of the bore, and pushed by an axial tightening pusher, the pusher having a longitudinal bore for passing the probe therethrough and being adjustable in a longitudinal position with respect to the body.

7. The gauge as claimed in claim 6, wherein the axial pusher is a screw fitted into the tapped end of the body.

8. The gauge as claimed in claim 6, wherein the axial pusher is an internally threaded ring, fitted by screwing on to the threaded rear end of the body.

9. The gauge as claimed in claim 8, wherein the internally threaded ring is covered by a loose ring mounted freely rotatable and longitudinally locked, associated with removable locking means for selectively interlocking the two rings.

10. The gauge as claimed in claim 9, wherein resilient means are further provided for ensuring friction between the internally threaded ring and the loose ring so that one drives the other while limiting the operating torque transmitted to the probe.

11. The gauge as claimed in claim 10, wherein the mobile member comprises, fitted to its front end, an insert stop having a longitudinal bore for passing the probe therethrough and shaped so as to mate with the shape of the reference surface of the workpiece to be tested.

12. The gauge as claimed in claim 11, wherein the insert stop is mounted freely rotatable and held in position longitudinally so as to come into abutment without moving against the workpiece to be tested during possible rotation of the probe penetrating into the hole.

13. The gauge as claimed in claim 11, wherein the insert stop comprises a substantially cylindrical rear part preferably in the form of an inverted cone engaging in the bore of the body by forcing slightly on an O ring inserted in a circular groove of the bore.

14. The gauge as claimed in claim 13, wherein the position indexing means comprise annular marks formed on the gauge body, opposite which the rear end of the chamfered sliding ring moves during the testing operation.

15. The gauge as claimed in claim 14, wherein the rear end of the sliding ring is provided with notches for making the annular marks partially visible should the ring go therebeyond.

16. The gauge as claimed in claim 15, wherein the probe is a threaded plug usually used for checking diameters and the evenness of the tappings.

* * * * *